US011505482B2

(12) United States Patent
Kowalski et al.

(10) Patent No.: US 11,505,482 B2
(45) Date of Patent: Nov. 22, 2022

(54) DYNAMIC PROCESS CONTROL FOR PARTIAL NITRITATION IN WASTEWATER TREATMENT WITH AUTOTROPHIC NITROGEN REMOVAL

(71) Applicant: University of Manitoba, Winnipeg (CA)

(72) Inventors: Maciej S. Kowalski, Winnipeg (CA); Jan Oleszkiewicz, Winnipeg (CA)

( * ) Notice: Subject to any disclaimer, the term of this patent is extended or adjusted under 35 U.S.C. 154(b) by 0 days.

(21) Appl. No.: 16/839,830

(22) Filed: Apr. 3, 2020

(65) Prior Publication Data
US 2020/0346956 A1      Nov. 5, 2020

Related U.S. Application Data

(60) Provisional application No. 62/841,344, filed on May 1, 2019.

(51) Int. Cl.
| | |
|---|---|
| *C02F 3/00* | (2006.01) |
| *C02F 3/08* | (2006.01) |
| *C02F 3/12* | (2006.01) |

(52) U.S. Cl.
CPC ............... *C02F 3/006* (2013.01); *C02F 3/08* (2013.01); *C02F 3/12* (2013.01); *C02F 2209/02* (2013.01);
(Continued)

(58) Field of Classification Search
CPC .... C02F 3/006; C02F 3/08; C02F 3/12; C02F 2209/02; C02F 2209/22; C02F 2209/14;
(Continued)

(56) References Cited

U.S. PATENT DOCUMENTS

| | | | | |
|---|---|---|---|---|
| 2016/0023932 A1* | 1/2016 | Bott | ......................... | C02F 3/105 210/630 |
| 2017/0008775 A1* | 1/2017 | Finke | ...................... | C02F 3/006 |

FOREIGN PATENT DOCUMENTS

| | | | | |
|---|---|---|---|---|
| CN | 105540851 A | * | 5/2016 | ............... C02F 3/302 |
| CN | 109437454 A | * | 3/2019 | ................ C02F 9/00 |

(Continued)

OTHER PUBLICATIONS

Clara Reino, Kinetic and microbiological characterization of aerobic granules performing partial nitritation of a low-strength wastewater at 10C, Water Research, May 20, 2016, Pertient pp. All (Year: 2016).*

Primary Examiner — Nam X Nguyen
Assistant Examiner — Ekandra S. Miller-Cruz
(74) Attorney, Agent, or Firm — Ryan W. Dupuis; Kyle R. Satterthwaite; Ade & Company Inc.

(57) ABSTRACT

Mainstream partial nitritation was studied at 10° C. in a moving bed biofilm reactor treating synthetic wastewater containing both nitrogen ($\approx$40 mg L-1) and organic carbon at COD/N ratio ranging from 1.3 to 2.2. Three different control strategies were investigated to achieve partial nitritation. Initially, biofilm age was controlled by incorporating a media replacement strategy. Next, separately from the media replacement, oxygen limited conditions were investigated and finally pH control was incorporated together with oxygen limitation. Successful partial nitritation was achieved only by combining oxygen limitation with pH control. The average NH4-N concentration was equal to 16.0±1.6 mg L-1 and average NO2-N concentration was equal to 15.7±2.4 mg L-1 during steady state partial nitritation. The average residual NO3-N concentration was equal to 2.6±2.2 mg L-1. The results obtained from this study prove for the first time that partial nitritation can be successfully controlled in a biofilm reactor treating wastewater (Continued)

with low nitrogen concentration, relatively high COD/N ratio and at low temperature. An algorithm for dynamic process control of partial nitritation has been also developed.

9 Claims, 6 Drawing Sheets

(52) U.S. Cl.
CPC ...... *C02F 2209/06* (2013.01); *C02F 2209/14* (2013.01); *C02F 2209/22* (2013.01)

(58) Field of Classification Search
CPC ... C02F 2209/06; C02F 3/307; C02F 2209/15
USPC .......................................................... 210/614
See application file for complete search history.

(56) References Cited

FOREIGN PATENT DOCUMENTS

| RU | 2671729 C2 | * | 11/2018 | ............... C02F 3/006 |
|----|------------|---|---------|---------------------------|
| WO | WO-2008046139 A1 | * | 4/2008 | ................ C02F 3/30 |
| WO | WO-2018176096 A1 | * | 10/2018 | ............... C02F 11/04 |

* cited by examiner

DYNAMIC PROCESS CONTROL FOR PARTIAL NITRITATION IN WASTEWATER TREATMENT WITH AUTOTROPHIC NITROGEN REMOVAL

This application claims the benefit under 35 U.S.C. 119(e) of U.S. provisional application Ser. No. 62/841,344, filed May 1. 2019.

FIELD OF THE INVENTION

The invention describes a method that allows for control of partial nitritation process in a biological reactor treating wastewater. An algorithm for dynamic process control of partial nitritation has been also developed and allows for process control under varying wastewater flows and loads, and temperatures.

BACKGROUND

Conventional nitrification/denitrification process in which ammonium is oxidized to nitrate and subsequently reduced to gaseous nitrogen is very energy intensive. Nitrification requires extensive aeration which can account for approximately 60 to 90% of energy requirements of the treatment plant (EPRI, 1994)). Denitrification in turn necessitates substantial amounts of biodegradable carbon which might not be available in wastewater in sufficient amounts when enhanced biological phosphorus removal is incorporated into the treatment train, especially in relatively weak North American wastewater (Oleszkiewicz et al., 2015). Although it has been shown that denitrifying PAOs could reduce the organic carbon requirements for denitrification (Mandel et al., 2019).

There are, however, few emerging technologies that have a potential to significantly minimize energy consumption, improve nutrient removal and even minimize greenhouse gas emissions. One such technology is aerobic granular sludge that has been intensively studied recently (Corsino et al., 2017; Derlon et al., 2016; Devlin et al., 2017). Aerobic granular sludge has the capability to provide nutrient removal within more compact footprints and higher energy efficiencies than conventional technologies and is commercially available as Nereda® (Adav et al., 2008). One of the problems with this technology, however, is that it is only available in sequencing batch reactors and the nitrogen removal is still based on conventional nitrification/denitrification (Morgenroth et al., 1997: Pronk et al., 2015).

A more promising technology that is getting a significant attention is the combination of mainstream partial nitritation (PN) with anaerobic ammonium oxidation (anammox). With the discovery of the anammox process (Mulder et al., 1995), nitrogen removal can be achieved with much lower aeration costs and almost insignificant organic carbon requirements. Ammonium removal using anammox is a fully autotrophic process where ammonium together with nitrite is combined and transformed to gaseous nitrogen and some nitrate (Strous et al., 1997). But since there is no nitrite in the wastewater partial nitritation is a necessary pre-treatment step in which approximately half of the ammonium in the wastewater is oxidized to nitrite. Nitrogen removal from warm, high strength waste streams via partial nitritation and anammox has become an established technology with over 100 installations worldwide (Ali and Okabe, 2015; Lackner et al., 2014) and has been also proven effective in treatment of industrial wastewater (Zekker et al., 2018).

The application of the anammox process technology to mainstream conditions is, however, proving extremely difficult. Firstly, municipal wastewater in places with moderate climate is subjected to seasonal temperature variations between approximately 20° C. and 10° C. and anammox efficiency has been shown to decrease rapidly below 20° C. with removal rates falling down to 0.03 kg N m-3 d-1 (Hendrickx et al., 2014: Sánchez Guillén et al., 2016). Nevertheless, the growth and enrichment of anammox bacteria at low temperatures is feasible as shown by Lotti et al. (2014) or Hu et al. (2013).

Secondly, even more problematic is the partial nitritation (De Clippeleir et al., 2013). At lower temperatures (>20° C.), nitrite oxidizing bacteria (NOB) have a kinetic advantage over ammonium oxidizing bacteria (AOB) with maximum specific growth rates higher than AOB (Kaelin et al., 2009: Sin et al., 2008; Wett and Rauch, 2003). For that reason, NOB must be constantly and selectively washed-out over AOB (and/or anaerobic ammonium oxidizing bacteria—AnAOB) in partial nitritation-anammox systems operating at low temperatures. Else, NOB activity should be supressed such that they cannot propagate within the system. Over the last several years, there has been some research into simultaneous PN/anammox with granular sludge. Lotti et al. (2014) reported very good TN removal of 86% at 20° C. but the removal decreased below 40% at 10° C. mainly due to nitrate production. Controlling residual ammonium concentration has been recently shown to partially supress NOB activity (Pool et al., 2016). Isanta et al. (2015) achieved stable partial nitritation in a granular sludge system at 12.5° C. and Reino et al. (2016) at 10° C. by maintaining an adequate ratio between dissolved oxygen (DO) and ammonium concentrations in the bulk liquid. The synthetic wastewater used in those studies, however, did not contain any or very little organic carbon and nitrogen concentration was still relatively high compared to a typically very weak (40-50 mg TN L-1) North American wastewater (Metcalf & Eddy et al., 2013).

More recently the research has become focused on partial nitritation using biofilm rather than granular systems. Moving bed biofilm reactors (MBBRs) have been shown to perform better and retain more anammox biomass at low temperatures (Gilbert et al., 2015, 2014). Piculell et al. (2016) reported successful partial nitritation at 15° C. in an MBBR reactor treating synthetic municipal wastewater by maintaining thin biofilm and alternating feeding of synthetic centrate. Laureni et al. (2016) reported successful NOB suppression at micro-aerophilic conditions (0.15-0.18 mg-O2 L-1) at 15° C. Bian et al. (2017) achieved stable partial nitritation through maintaining a constant ratio of 0.17 between DO and total ammonium nitrogen (TAN) concentration at 6-16° C., similar to Isanta et al. (2015).

The following documents ere referenced within this patent application by name and are hereby incorporated by reference.

Adav, S. S., Lee, D.-J., Shew, K.-Y., Tay, J.-H., 2008. Aerobic granular sludge: Recent advances. Biotechnol. Adv. 26, 411-423. https://doi.org/10.1016/j.biotechadv.2008.05.002

Ali, M., Okabe, S., 2015. Anammox-based technologies for nitrogen removal: Advances in process start-up and remaining issues. Chemosphere 141, 144-53. https://doi.org/10.1016/j.chemosphere.2015.06.094

Anthonisen, a C., 1977. Inhibition of nitrification and nitrous acid compounds. Water Pollut. Control Fed. 48, 835-852.

APHA, 2005, Standard methods for the examination of water and waste water, 21st ed. American Public Health Association, Washington, D.C.

Bian, W., Zhang. S., Zhang, Y., Li, W., Kan, R., Wang, W., Zheng, Z., Li, J., 2017. Achieving nitritation in a continuous moving bed biofilm reactor at different temperatures through ratio control. Bioresour. Technol. 226, 73-79. https://doi.org/10.1016/j.biortech.2016.12.014

Corsino, S. F., di Biase, A., Devlin, T. R., Munz, G., Torregrossa, M., Oleszkiewicz, J. A., 2017. Effect of extended famine conditions on aerobic granular sludge stability in the treatment of brewery wastewater. Bioresour. Technol. 226, 150-157, https://doi.org/10.1016/j.biortech.2016.12.026

De Clippeleir, H., Vlaeminck, S. E., De Wilde, F., Daeninck, K., Mosquera, M., Boeckx, P., Verstraete, W., Boon, N., 2013. One-stage partial nitritation/anammox at 15° C. on pretreated sewage: feasibility demonstration at lab-scale. Appl. Microbiol. Biotechnol. 97, 10199-10210. https://doi.org/10.1007/s00253-013-4744-x Derlon, N., Wagner, J., da Costa, R. H. R., Morgenroth, E., 2016. Formation of aerobic granules for the treatment of real and low-strength municipal wastewater using a sequencing batch reactor operated at constant volume. Water Res. 105, 341-350. https://doi.org/10.1016/j.watres.2016.09.007

Devlin, T. R., di Biase, A., Kowalski, M., Oleszkiewicz, J. A., 2017. Granulation of activated sludge under low hydrodynamic shear and different wastewater characteristics. Bioresour. Technol. 224, 229-235. https://doi.org/10.1016/j.biortech.2016.11.005

EPRI, 1994. Energy Audit Manual for Water and Wastewater Facilities. Electric Power Research Institute, St. Louis, Mo.

Gilbert, E. M., Agrawal, S., Karst, S. M., Horn, H., Nielsen, P. H., Lackner, S., 2014. Low Temperature Partial Nitritation/Anammox in a Moving Bed Biofilm Reactor Treating Low Strength Wastewater. Environ. Sci. Technol. 48, 8784-8792. https://doi.org/10.1021/es501649m Gilbert, E. M., Agrawal, S., Schwartz, T., Horn, H., Lackner, S., 2015. Comparing different reactor configurations for Partial Nitritation/Anammox at low temperatures. Water Res. 81, 92-100. https://doi.org/10.1016/j.watres.2015.05.022

Gratziou, M., Chrisochoidou, P., n.d. Cost analysis of waste water nitrogen removal in Greece. Proc. Int. Conf. Environ. Manag. Eng. Plan. Econ. Ski. Greece. 2011.

Hendrickx, T. L. G., Kampman, C., Zeeman, G., Temmink, H., Hu, Z., Kartal, B., Buisman, C. J. N., 2014. High specific activity for anammox bacteria enriched from activated sludge at 10 C. Bioresour. Technol. 163, 214-222. https://doi.org/10.1016/j.biortech.2014.04.025

Hu, Z., Lotti. T., de Kreuk, M., Kleerebezem. R., van Loosdrecht, M., Kruit, J., Jetten, M. S. M., Kartal, B., 2013. Nitrogen Removal by a Nitritation-Anammox Bioreactor at Low Temperature. Appl. Environ. Microbiol. 79, 2807-2812. https://doi.org/10.1128/AEM.03987-12

Isanta, E., Reino, C., Carrera, J., Pérez, J., 2015. Stable partial nitritation for low-strength wastewater at low temperature in an aerobic granular reactor. Water Res. 80, 149-158. https://doi.org/10.1016/J.WATRES.2015.04.028

Kaelin, D., Manser, R., Rieger, L., Eugster, J., Rottermann, K., Siegrist, H., 2009. Extension of ASM3 for two-step nitrification and denitrification and its calibration and validation with batch tests and pilot scale data. Water Res. 43, 1680-1692. https://doi.org/10.1016/j.watres.2008.12.039

Lackner, S., Gilbert, E. M., Vlaeminck, S. E., Joss, A., Horn, H., van Loosdrecht, M. C. M., 2014. Full-scale partial nitritation/anammox experiences—An application survey. Water Res. 55, 292-303. https://doi.org/10.1016/j.watres.2014.02.032

Lashkarizadeh, M., Yuan, Q., Oleszkiewicz, J.A., 2015. Influence of carbon source on nutrient removal performance and physical-chemical characteristics of aerobic granular sludge. Environ. Technol. 36, 2161-2167. https://doi.org/10.1080/09593330.2015.1023364

Laureni, M., Falás. P., Robin, O., Wick, A., Weissbrodt, D. G., Nielsen, J. L., Ternes, T. A., Morgenroth, E., Joss, A., 2016. Mainstream partial nitritation and anammox: long-term process stability and effluent quality at low temperatures. Water Res. 101, 628-639. https://doi.org/10.1016/j.watres.2016.05.005

Lotti, T., Kleerebezem, R., Hu, Z., Kartal, B., Jetten, M. S. M., van Loosdrecht, M. C. M. 2014. Simultaneous partial nitritation and anammox at low temperature with granular sludge. Water Res. 66, 111-21. https://doi.org/10.1016/j.watres.2014.07.047

Mandel, A., Zekker, I., Jaagura, M., Tenno, T., 2019Enhancement of anoxic phosphorus uptake of denitrifying phosphorus removal process by biomass adaption. Int. J. Environ. Sci. Technol. https://doi.org/10.1007/s13762-018-02194-2

Mauret, M., Paul, E., Puech-Costes, E., Maurette, M. T., Baptiste, P., 1996. Application of experimental research methodology to the study of nitrification in mixed culture. Water Sci. Technol. 1-2, 245-252.

Metcalf & Eddy, Tchobanoglous, G., Stensel, H. D., Tsuchihashi, R., Burton, F. L. (Franklin L., Abu-Orf, M., Bowden, G., Pfrang, W., 2013. Wastewater engineering; treatment and resource recovery.

Molinos-Senante, M., Hernández-Sancho, F., Sala-Garrido, R., 2010. Economic feasibility study for wastewater treatment: A cost-benefit analysis. Sci. Total Environ 408, 4396-4402. https://doi.org/10.1016/j.scitotenv.2010.07.014

Morgenroth, E., Sherden, T., Van Loosdrecht, M. C. M., Heijnen, J. J., Wilderer, P. A., 1997. Aerobic granular sludge in a sequencing batch reactor. Water Res. 31, 3191-3194. https://doi.org/10.1316/S0043-1354(97)00216-9

Mulder, A., van de Graaf, A. A., Robertson, L. A., Kuenen, J. G., 1995. Anaerobic ammonium oxidation discovered in a denitrifying fluidized bed reactor. FEMS Microbiol. Ecol. 16, 177-183. https://doi.org/10.1016/0168-6496(94)00081-7

Oleszkiewicz, J., Kruk, D., Devlin, T., Lashkarizadeh, M., Yuan, Q., Mavinic, D. S., Lobanov, S., Nakhla, G., Macbride, B., 2015. Options for Improved Nutrient Removal and Recovery from Municipal Wastewater in the Canadian Context.

Piculell, M., Christensson, M., Jönsson, K., Welander, T., 2015. Partial nitrification in MBBRs for mainstream deammonification with thin biofilms and alternating feed supply. Water Sci. Technol. 73, wst2015599. https://doi.org/10.2166/wst.2015.599

Piculell, M., Welander, P., Jönsson, K., Welander, T., 2016. Evaluating the effect of biofilm thickness on nitrification in moving bed biofilm reactors. Environ. Technol. (United Kingdom) 37, 732-743. https://doi.org/10.1080/09593330.2015.1080308

Poot, V., Hoekstra, M., Geleijnse, M. A. A., van Loosdrecht, M. C. M., Pérez, J., 2016. Effects of the residual ammonium concentration on NOB repression during partial nitritation with granular sludge. Water Res. 106, 518-530. https://doi.org/10.1016/j.watres.2016.10.028

Pronk, M., de Kreuk, M. K., de Bruin, B., Kamminga, P., Kleerebezem, R., van Loosdrecht, M. C. M., 2015. Full scale performance of the aerobic granular sludge process for sewage treatment. Water Res. 84, 207-217. https://doi.org/10.1016/j.watres.2015.07.011

Reino, C., Suárez-Ojeda, M. E., Pérez. J., Carrera, J., 2016. Kinetic and microbiological characterization of aerobic granules performing partial nitritation of a low-strength wastewater at 10° C. Water Res. 101, 147-156. https://doi.org/10.1016/J.WATRES.2016 05.059

Rodriguez Garcia, G., Molinos-Senante, M., Hospido, A., Hernández-Sancho, F., Moreira, M. T., Feijoo, G., 2011. Environmental and economic profile of six typologies of wastewater treatment plants. Water Res. 45, 5997-6010. https://doi.org/10.1016/j.watres.2011.08.053

Sánchez Guillén, J. A., Lopez Vazquez, C. M., de Oliveira Cruz, L. M., Brdjanovic, D., van Lier, J. B., 2016. Long-term performance of the Anammox process under low nitrogen sludge loading rate and moderate to low temperature. Biochem. Eng. J. 110, 95-106. https://doi.org/10.1016/j.bej.2016.02.004

Sin, G., Kaelin, D., Kampschreur, M. J., Takács, I., Wett, B., Gernaey, K. V., Rieger, L., Siegrist, H., van Loosdrecht, M. C. M., 2008. Modelling nitrite in wastewater treatment systems: a discussion of different modelling concepts. Water Sci. Technol. 58, 1155-1171. https://doi.org/10.2166/wst.2008.485

Strous, M., Van Gerven, E., Zheng, P., Kuenen, J. G., Jetten, M. S. M., 1997. Ammonium removal from concentrated waste streams with the anaerobic ammonium oxidation (Anammox) process in different reactor configurations. Water Res. 31, 1955-1962. https://doi.org/10.1016/S0043-1354(97)00055-9

Tenno, T., Rikmann, E., Uiga, K., Zekker, I., Mashirin, A., Tenno, T., 2018. A novel proton transfer model of the closed equilibrium system H2O-CO2-CaCO3-NH X. Proc. Est. Acad. Sci. 67, 260. https://doi.org/10.3176/proc.2018.3.04

Turk, O., Mavinic, D. S., 1986. Preliminary assessment of a shortcut in nitrogen removal from wastewater. Can. J. Civ. Eng. 13, 600-605. https://doi.org/10.1139/l86-094

Wett, B., Jimenez, J. A., Takács, I., Murthy, S., Bratby, J. R., Holm, N. C., Rönner-Holm, S. G. E., 2011. Models for nitrification process design: one or two AOB populations? Water Sci. Technol. 64, 568-578. https://doi.org/10.2166/wst.2011.499

Well, B., Rauch, W., 2003. The role of inorganic carbon limitation in biological nitrogen removal of extremely ammonia concentrated wastewater. Water Res. 37, 1100-1110. https://doi.org/10.1016/S0043-1354(02)00440-2

Wong-Chong, G. M., Loehr, R. C., 1975. The kinetics of microbial nitrification. Water Res. 9, 1099-1106. https://doi.org/10.1016/0043-1354(75)90108-6

Zekker, I., Kivirüüt, A., Rikmann, E., Mandel. A., Jaagura, M., Tenno, T., Artemchuk, O., dC Rubin, S., Tenno, T., 2018. Enhanced Efficiency of Nitritating-Anammox Sequencing Batch Reactor Achieved at Low Decrease Rates of Oxidation-Reduction Potential. Environ. Eng. Sci. ees.2018.0225. https://doi.org/10.1089/ees.2018.0225

Zessner, M., Lampert, C., Kroiss, H., Lindtner, S., 2010. Cost comparison of wastewater treatment in Danubian countries. Water Sci. Technol. 62. 223-230. https://doi.org/10.2166/wst.2010.271

SUMMARY OF THE INVENTION

The present invention addresses some of the problems noted above in the prior art and allows partial oxidation of ammonium to nitrite. More particularly, the present invention has arisen from a study examining the feasibility of mainstream partial nitritation treating carbon-rich synthetic wastewater with low nitrogen concentrations (≈40 mg N L-1) and at a temperature of 10° C. in a biofilm reactor. Three different control strategies were investigated to achieve partial nitritation. Initially, biofilm age was controlled by incorporating a media replacement strategy. Next, separately from the media replacement, oxygen limited conditions were investigated and finally pH control was incorporated together with oxygen limitation. Stable partial nitritation was primarily achieved by combining high pH and oxygen limitation.

According to one aspect of the invention there is provided a wastewater treatment system comprising:

a biological reactor for receiving wastewater therein for partial nitritation of the wastewater;

a plurality of condition sensors for generating respective condition signals from which a plurality of wastewater characteristics can be derived including a pH level of the wastewater in the reactor;

a dispenser for dispensing an alkaline control solution into the reactor; and a controller arranged to compare one of the wastewater characteristics derived from the condition sensors to a prescribed primary threshold and control the dispenser to dispense a controlled dosage of the alkaline control solution into the reactor in response to the wastewater characteristic being below the prescribed primary threshold.

The reactor may comprise a moving bed biofilm reactor, or an integrated fixed film activated sludge reactor.

The controller is preferably arranged to cease the dispensing of the alkaline control solution into the reactor in response to the pH level exceeding a pH threshold.

Preferably the system further comprises: (a) the condition sensors including sensors for measuring the pH level, a dissolved oxygen level, an ammonium level, and a temperature in the reactor: (b) the prescribed primary threshold comprising a free ammonia threshold: and (c) the controller being arranged to (i) calculate a level of free ammonia based upon the wastewater characteristics derived from the condition sensors, and (ii) control the dispenser such that the alkaline control solution is dispensed only if a level of free ammonia in the wastewater is below the prescribed primary threshold. The prescribed primary threshold is preferably stored on the controller so as to be controllably adjustable.

The system may further comprise an aerator for aerating the wastewater in the reactor.

Preferably the system further comprises: (a) the condition sensors including sensors for measuring the pH level, a dissolved oxygen level, an ammonium level, and a temperature in the reactor; (b) the controlling including a prescribed second threshold stored thereon comprising a ratio of dissolved oxygen to a total ammonium concentration threshold: and (c) the controller being arranged to (i) calculate a ratio of dissolved oxygen to a total ammonium concentration based upon the wastewater characteristics derived from the condition sensors, and (ii) control the aerator so as to maintain the ratio of dissolved oxygen to a total ammonium concentration below the prescribed second threshold. The prescribed second threshold is preferably stored on the controller so as to be controllably adjustable.

According to another aspect of the present invention there is provided a method of treating wastewater comprising:

providing a biological reactor for receiving wastewater therein;

using an aerator to intermittently aerate the wastewater in the reactor;

using a plurality of condition sensors to generate condition signals from which a plurality of wastewater characteristics can be derived including a pH level of the wastewater in the reactor;

using a controller to compare one of the wastewater characteristics derived from the condition sensors to a prescribed primary threshold stored on the controller; and using the controller to dispense a controlled dosage of an alkaline control solution into the reactor in response to the wastewater characteristic being below the prescribed primary threshold to effect partial nitration of the wastewater in the reactor.

The reactor may comprise a moving bed biofilm reactor, or an integrated fixed film activated sludge reactor.

The method preferably includes ceasing dispensing of the alkaline control solution into the reactor in response to the pH level exceeding a pH threshold.

The method may further include: (a) using the condition sensors to measure the pH level, a dissolved oxygen level, an ammonium level, and a temperature of the wastewater in the reactor; (b) using the controller to calculate a level of free ammonia based upon the wastewater characteristics derived from the condition sensors; and (c) using the controller to control the dispensing of the controlled dosage of the alkaline control solution only if a level of free ammonia in the wastewater is below the prescribed primary threshold. Preferably the prescribed primary threshold stored on the controller is controllably adjusted dependent upon the measured wastewater characteristics, for example the temperature of the wastewater.

The method may further include: (a) using the condition sensors to measure the pH level, a dissolved oxygen level, an ammonium level, and a temperature of the wastewater in the reactor; (b) using the controller to calculate a ratio of dissolved oxygen to a total ammonium concentration based upon the wastewater characteristics derived from the condition sensors; and (c) using the controller to control the aerator so as to maintain the ratio of dissolved oxygen to a total ammonium concentration below a prescribed second threshold stored on the controller. Preferably the prescribed second threshold is adjusted dependent upon the measured wastewater characteristics.

The method may further include: (a) using a plurality of condition sensors to measure a plurality of wastewater characteristics of the wastewater; (b) using the controller to calculate a level of free ammonia based upon the measured characteristics of the wastewater; and (c) using the controller to generate a notification if the level of free ammonia has not increased over a prescribed time interval.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
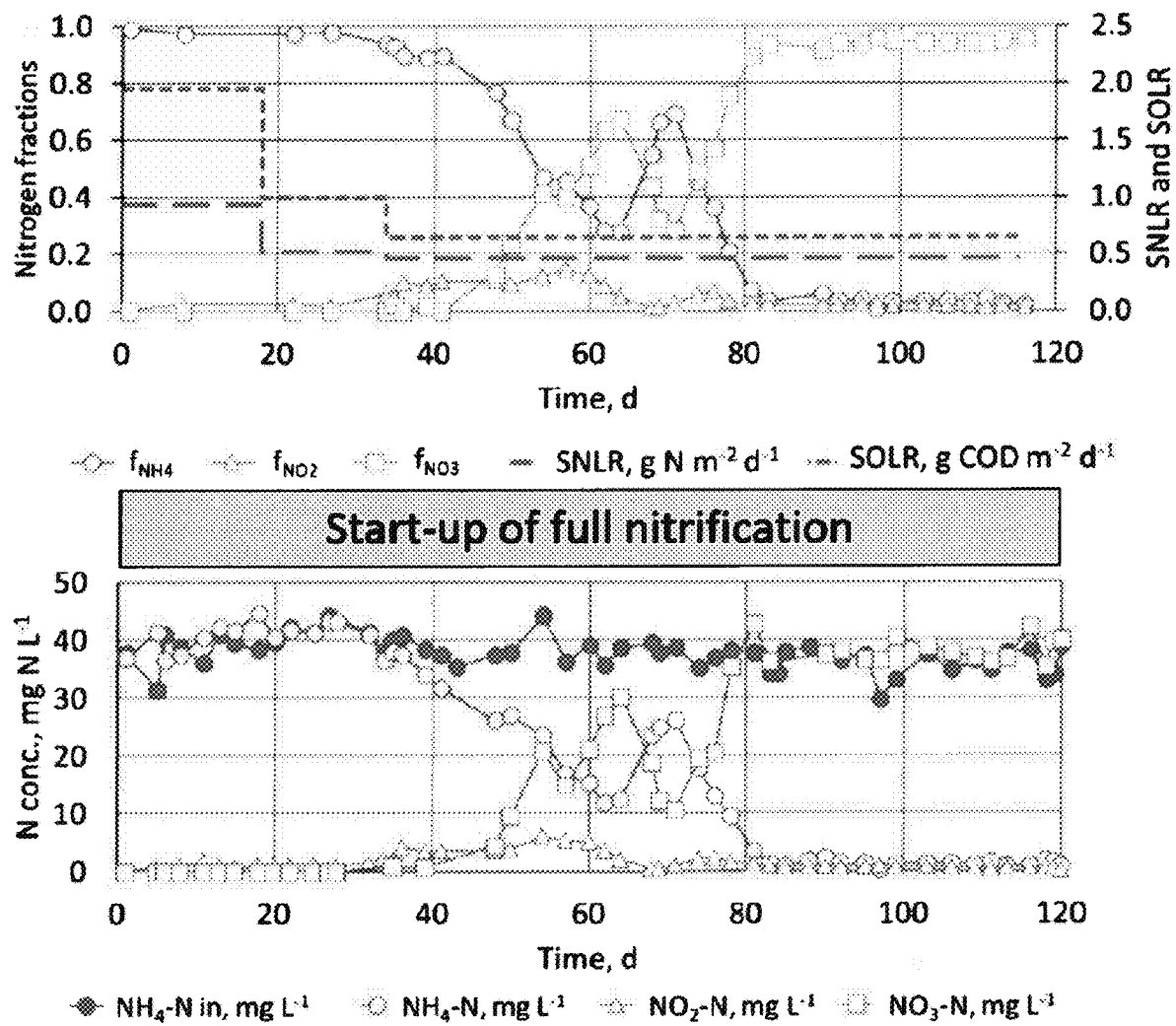
FIG. 1 shows in the top image effluent nitrogen species fractionation during start-up period including fNH4—ammonium fraction, fNO2—nitrite fraction and fNO3—nitrate fraction as well as surface nitrogen loading rate (SNLR; g N m-2 d-1) and surface organic loading rate (SOLR; g COD m-2 d-1), and shows in the bottom image effluent ammonium, nitrite and nitrate concentration as well as influent ammonium concentration during start-up period.
Figure 2:
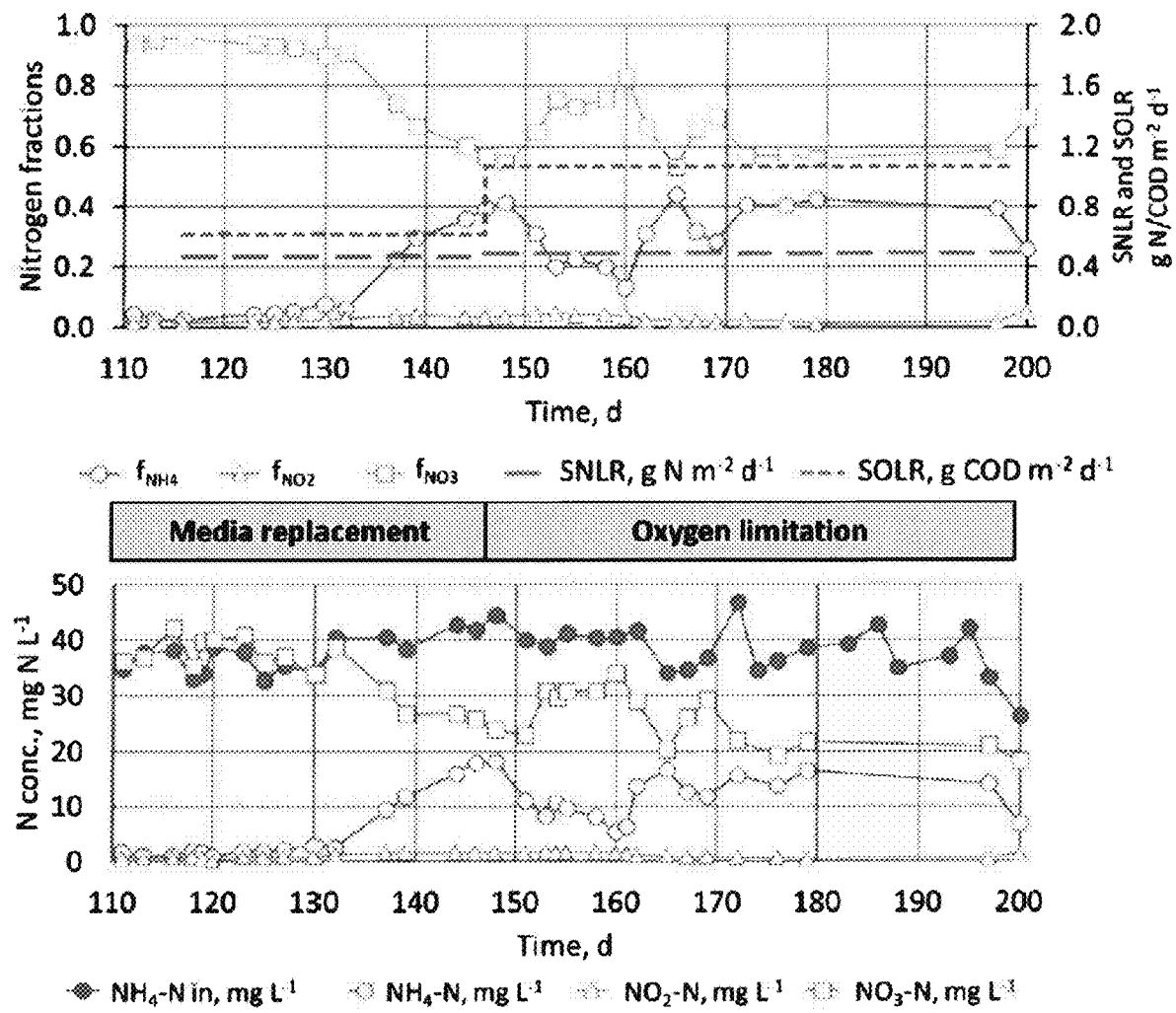
FIG. 2 shows in the top image effluent nitrogen species fractionation during media replacement and aeration control period including fNH4—ammonium fraction. fNO2—nitrite fraction and fNO3—nitrate fraction as well as surface nitrogen loading rate (SNLR; g N m-2 d-1) and surface organic loading rate (SOLR; g COD m-2 d-1), and shows in the bottom image effluent ammonium, nitrite and nitrate concentration as welt as influent ammonium concentration.

The following abbreviations are referred to in this document:

AFR—airflow rate
anammox—anaerobic ammonium oxidation
AnAOB—anaerobic ammonium oxidizing bacteria
AOB—ammonium oxidizing bacteria
BNR—biological nutrient removal
CEPT—chemically enhanced primary treatment
COD—chemical oxygen demand
DAF—dissolved air flotation
DO—dissolved oxygen
EBPR—enhanced biological phosphorus removal
FA—free ammonia
fNH4—ammonium fraction of TIN in the effluent
fNO2—nitrite fraction of TIN in the effluent
fNO3—nitrate fraction of TIN in the effluent
HRT—hydraulic retention time
MBBR—moving bed biofilm reactor
NOB—nitrite oxidizing bacteria
OLR—organic loading rate
PAOs—phosphorus accumulating organisms
PN—partial nitritation
RAS—returned activated sludge
SNLR—surface nitrogen loading rate
SOLR—surface organic loading rate
RT—sludge retention time
TAN—total ammonium nitrogen
TIN—total inorganic nitrogen
TN—total nitrogen
TSS—total suspended solids
UASB—upflow anaerobic sludge blanket
VSS—volatile suspended solids Referring to the accompanying figure there is illustrated a wastewater treatment system generally indicated by reference numeral 100. The system 100 generally includes a biological reactor 10 comprising a containment vessel to receive material to be treated therein, a plurality of condition sensors 12 in communication with the material in the vessel for sensing various parameters relating to the contents within the reactor vessel, a dispenser 14 including a pump arranged to pump an alkaline control solution from a supply reservoir into the reactor vessel in a controlled amount, an aerator 16 including a pump for pumping air into the reactor vessel through an array of nozzles supported across a bottom of the reactor vessel for aerating the wastewater in the reactor vessel, and a controller 18 arranged to received sensed characteristics communicated from the sensors 12 and to operate the dispenser and the aerator. The condition sensors 12 generate respective condition signals from which a plurality of wastewater characteristics can be derived including a pH level of the wastewater in the reactor. The reactor 10 may be a moving bed biofilm reactor or an integrated fixed film activated sludge reactor.

The controller 18 is a computer controller including a memory storing programming instructions thereon and a processor arranged to execute the programming instructions so as to perform the various functions of the system 100 described herein. More particularly, the controller compares one of the wastewater characteristics derived from the condition sensors to a prescribed primary threshold stored on the controller so as to control the dispenser to dispense a controlled dosage of the alkaline control solution into the reactor in response to the wastewater characteristic being below the prescribed primary threshold. The controller is arranged to cease the dispensing of the alkaline control solution into the reactor in response to the pH level exceeding a pH threshold.

When the condition sensors include sensors for measuring the pH level, a dissolved oxygen level, an ammonium level, and a temperature in the reactor and the prescribed primary threshold is a free ammonia threshold, the controller is arranged to (i) calculate a level of free ammonia based upon the wastewater characteristics derived from the condition sensors, and (ii) control the dispenser such that the alkaline control solution is dispensed only if a level of free ammonia in the wastewater is below the prescribed primary threshold. The prescribed primary threshold is stored on the controller so as to be controllably adjustable.

When the condition sensors include sensors for measuring the pH level, a dissolved oxygen level, an ammonium level, and a temperature in the reactor, a prescribed second threshold may be stored on the controller which comprises a ratio of dissolved oxygen to a total ammonium concentration threshold. In this instance, the controller is arranged to (i) calculate a ratio of dissolved oxygen to a total ammonium concentration based upon the wastewater characteristics derived from the condition sensors, and (ii) control the aerator so as to maintain the ratio of dissolved oxygen to a total ammonium concentration below the prescribed second threshold. The prescribed second threshold is stored on the controller so as to be controllably adjustable.

Materials and Methods
Experimental Set-Up

Partial nitrification was conducted in a plexiglas circular reactor with 5 L working volume. The reactor was filled to 40% with HeadworksBio 450 type media (protected surface area of 402 m2/m3). The reactor was then seeded with return activated sludge (RAS) from a full-scale biological nutrient removal (BNR) plant in Winnipeg (Manitoba, Canada). The reactor was constantly aerated at the air flowrate of 0.1-5 L/min and fed with synthetically prepared medium. The medium contained ammonium chloride (NH4Cl), yeast extract (as source of COD) and sodium bicarbonate (NaHCO3). Micronutrients solution was also added according to (Lashkarizadeh et al., 2015). The reactor was kept in an environmental chamber (Conviron, USA) at 10±1° C. throughout the experimental period. HRT of the reactor was controlled with a peristaltic pump (Masterflex L/S. Cole-Parmer) at 6-12 h. pH was monitored with a general-purpose pH probe (Oakton®, USA) but online measurements were not recorded. Prior to the installation of pH control (Oakton pH/ORP controller, USA), the pH oscillated between 6.5 and 7.5 with a single event when the pH dropped to 5.5. On day 202 pH control was installed and the pH was maintained at 8.6±0.1. DO was measured with an optical probe (Orion RDO, Thermo Scientific, USA) and portable DO meter (Orion 3 Star, Thermo Scientific, USA). Biomass washing out of the reactor was not returned to the reactor after seeding.

Table 1 summarizes experimental conditions throughout the different periods of the study.

| | Period of the study | | | | | |
|---|---|---|---|---|---|---|
| | Start-up and full nitrification | | | Media replacement | Aeration Control | pH Control |
| Days | 0-17 | 18-33 | 34-115 | 116-146 | 147-199 | 200-250 |
| NH4-N in feed, mg L-1 | 38 | 41 | 37 | 38 | 39 | 38 |
| St. dev. | 3 | 2 | 2 | 5 | 3 | 4 |
| Surface NLR, g N m-2 d-1 | 0.94 | 0.51 | 0.46 | 0.5 | 0.49 | 0.46 |
| St. dev. | 0.08 | 0.02 | 0.03 | 0.6 | 0.05 | 0.03 |
| COD in feed, mg L-1 | 79 | | 52 | 58 | 86 | 82 |
| St. dev. | 2 | | 25 | 28 | 33 | 23 |
| Surface OLR, g COD m-2 d-1 | 1.95 | 1 | 0.6 | 0.6 | 1.1 | 0.8 |
| St. dev. | 0.04 | — | 0.3 | 0.2 | 0.4 | 0.4 |
| HRT, h | 6 | | | 12 | | |
| AFR, L min-1 | | | 5 | | 5-0.1 | 0.1 |

Analytical Methods

The performance of the MBBR reactor was monitored by observing the fractionation of inorganic nitrogen species in the effluent. The ammonium fractions (fNH4) were expressed with the following equation (1):

$$f_{NH4} = \frac{(NH_4 - N_R)}{(TIN)}. \qquad (1)$$

Nitrite and nitrate fractions (fNO2, fNO3) which describe how much of the oxidized ammonium was converted to either of the two were calculated according to equation (2) and (3):

$$f_{NO2} = \frac{(NO_2 - N_R)}{(TIN)} \qquad (2)$$

$$f_{NO3} = \frac{(NO_3 - N_R)}{(TIN)}, \qquad (3)$$

where: NH4-NR—ammonium nitrogen concentration in the reactor, NO2-NR—nitrite nitrogen concentration in the reactor, NO3-NR—nitrate nitrogen concentration in the reactor. TIN—total inorganic nitrogen concentration in the reactor.

It was assumed that total inorganic nitrogen (TIN) in the effluent was made up of only NH4, NO2 and NO3 and so the sum of fNH4, fNO2 and fNO3 equals to 1. Organic nitrogen was not analyzed in the study due to negligible concentration.

Average surface nitrogen loading rate (SNLR), as well as surface organic loading rate (SOLR) were also calculated for each period of the study. Nitrite, nitrate and ammonium concentrations in the influent and effluent were measured three times a week by a flow injection analyser (Lachat QuikChem 8500, HACH, CA). TIN was calculated as the sum of nitrite, nitrate and ammonium nitrogen.

Free ammonia (FA) concentration was calculated using the following equation according to (Anthonisen, 1977):

$$FA(mg\ NH_3 - NL^{-1}) = \frac{TAN_R * 10^{pH}}{e^{6344(273+T)} + 10^{pH}}, \quad (4)$$

where: TANR—total ammonium nitrogen concentration in the reactor, T—temperature.

Chemical oxygen demand (COD), volatile suspended solids (VSS) and total suspended solids (TSS) were measured according to Standard Methods (APHA, 2005). Biofilm solids on the plastic carriers were measured after scarping the biomass off with a cotton swab and de-ionized water. Pictures of the biofilm were taken using a stereoscopic microscope (Zeiss Stereo Discovery.V6, USA) with magnification that varied from 0.315× to 1.5×. Biofilm thickness was measured using CMEIAS(c), an open-source image analysis software. All samples that required filtration were run through medium porosity Q5 filter paper (Fisher 178 Scientific. CA).

Results and Discussion

Reactor Start-Up

The MBBR was seeded with BNR sludge. The initial concertation of biomass in the reactor of approximately 1.7 g VSS L-1. After seeding, the biomass was left to naturally wash out from the reactor. The initial SNLR and SOLR were equal to 0.94±0.08 g N m-2 d-1 and 1.95±0.04 g COD m-2 d-1, however, no nitrification was observed during the first 17 days. The media were microscopically inspected, and a layer of biofilm had already been formed on the surface of the media. The thickness was measured to be equal to 166±61 μm. Since no nitrification was observed, the loading rates were lowered to 0.51±0.02 g N m-2 d-1 and 1 g COD m-2 d-1 by increasing the HRT of the reactor from 6 to 12 h. On day 34, the biofilm thickness was equal to 159±38 μm. To accelerate nitrification the SOLR was further decreased to 0.65±0.31 1 g COD m-2 d-1 during the rest of the start-up period. After decreasing the SOLR, a quick start-up of nitrification was observed. On day 64, the pH in the reactor dropped to 5.5 due to alkalinity deficiency and ammonium oxidation dropped from 62% to 32% on day 71. Nitrification recovered quickly (10 days) and 96% ammonium removal was reached on day 83 with subsequent stable operation throughout the rest of this phase. The biofilm thickness was measured on day 113 and was equal to 147±44 μm. FIG. 1 shows the performance of the reactor during the whole start-up period.

The aim of the start-up phase was to establish full nitrification and consequently focus on controlling partial nitritation. Some build-up of nitrite was observed during start-up. Maximum nitrite concentration reached 6 mg L-1 on day 54 but then quickly subsided to lower than 1 mg L-1. No nitrite accumulation was also observed during the pH upset.

Media Replacement

The first strategy to control partial nitritation was based on a concept of sludge retention time (SRT). NOB have higher maximum growth rates than AOB at temperatures lower than 27° C. which gives them a significant kinetic advantage and consequently nitrite is consumed by NOB as soon as it becomes available (Wett et al., 2011). This makes it necessary to selectively control the population of NOB over AOB. However, under transient conditions (e.g. during nitrification start up), nitrite can accumulate to significant concentrations since NOB growth cannot occur until AOB produce nitrite. To simulate these conditions a strategy based on replacing media at a certain rate was implemented. AOB would grow on a surface of a new media before NOB and produce nitrite before getting replaced with a virgin media hence maintaining a form of a constant start-up in the reactor. As a side-effect of this control strategy an average thickness of the biofilm was expected to decrease, and thin biofilms were previously shown to contribute to more efficient nitritation (Piculell et al., 2016).

Starting from day 116, 10 media/day were replaced (10 carriers were manually withdrawn from the reactor and 10 virgin carriers were put back in) producing a theoretical SRT of about 17 d. From day 113 to 132 ammonium oxidation dropped only slightly from 0.95 to 0.90 and no nitrite production was observed. Rapid decrease in nitrification was observed after day 136 when ammonium oxidation dropped to 0.53 but still no nitrite production was observed with fNO2 and fNO3 of 0.04 and 0.43, respectively. The average biofilm thickness in the reactor decreased significantly and was equal to 111±29 μm on day 146. These results stand contrary to the observations made by Piculell et al. (2016, 2015) who reported increased nitrite production in thin biofilms. Under conditions studied in this paper, however, thickness of the biofilm had no impact on nitrite production.

Oxygen Limitation

On day 146 media replacement was stopped as the approach was deemed unsuccessful and in order to prevent total loss of nitrification. Immediate recovery of nitrification occurred and on day 160 the ammonium oxidation reached 87%. Biofilm thickness was measured on day 162 and was equal to 300±110 μm. From that point air flow rate to the reactor was adjusted stepwise in order to control ammonium oxidation at about 0.6 which is required for anammox. As the air flow rate was decreased to 0.1 L min-1 the mixing in the reactor became insufficient and an additional nitrogen sparging was installed to mix the reactor. Nitrogen flow rate to the reactor was set to 5.5 L min-1.

During this period of the study the reactor was submitted to significant oxygen limitation. Oxygen limitation was assessed based on R value, which represents a ratio of DO to TAN concentration in the reactor. When the R value is lower than 3.94 the conditions are assumed to be oxygen limited for full nitrification. Application of this ratio as a control strategy for partial nitritation was used by Bian et al. (2017) who reported successful partial nitritation at R values lower than 0.17. Contrary to the observations made by Bian et al. (2017) even though the reactor operated at oxygen-limited conditions while nitrifying approximately 60% of influent ammonium still no nitrite accumulation was observed. At these conditions R value in the reactor oscillated at around 0.1 but still no nitritation was observed. The authors believe that the apparent discrepancy between the observations may arise from the difference in influent characteristics. While Bian et al. (2017) used synthetic wastewater with no organic carbon, this study treated carbon-rich wastewater with COD/N ratio of approximately 2.2 (average from the period between days 146 and 199). On day 197 the media were microscopically inspected, and the biofilm thickness was equal to 320±91 μm.

pH Control Strategy

Figure 3:
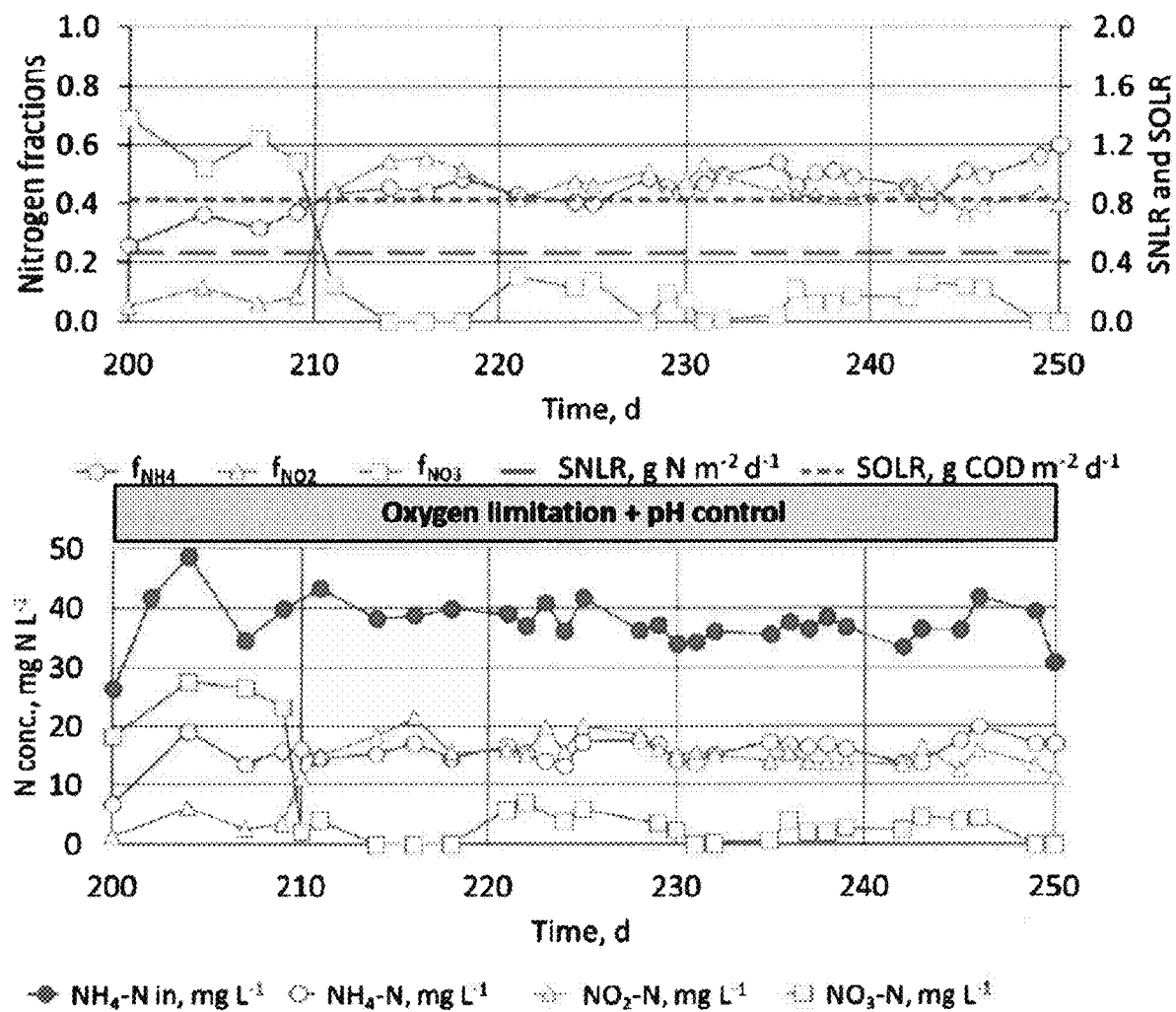
FIG. 3 shows in the top image effluent nitrogen species fractionation during pH control period: fNH4—ammonium fraction. fNO2—nitrite fraction and fNO3—nitrate fraction as well as surface nitrogen loading rate (SNLR; g N m-2 d-1) and surface organic loading rate (SOLR; g COD m-2 d-1) and shows in the bottom image effluent ammonium, nitrite and nitrate concentration as well as influent ammonium concentration during pH control period.

Starting from day 200, the pH in the reactor was controlled at 8.6±0.1 by dosing 0.125 M aqueous solution of sodium hydroxide (NaOH). The air flow rate to the reactor was kept constant at 0.1 L min-1 and none of the other operational parameters were changed. Following the increase in pH, a significant increase in fNO2 and simultaneous decrease in fNO3 was observed during the next two weeks (FIG. 3—top). On day 214 the fractions of NH4-N NO2-N and NO3-N in the reactor were equal to 0.40, 0.48 and 0.12, respectively with NO2-N/NH4-N ratio of 1.2. The average SNLR during this period was equal to 0.46±0.02 g N m-2 d-1 and average SOLR was equal to 0.83±0.42 g COD m-2 d-1. FIG. 3 (bottom) shows the respective nitrogen species concentrations. The average NH4-N concentration was equal to 16.0±1.6 mg L-1 and average nitrite concentration equaled to 15.7±2.4 mg L-1 during the period of stable partial nitrification with the NO2-N/NH4-N ratio of 0.98. The average residual nitrate concentration during steady state partial nitrification was equal to 2.6±2.2 mg L-1. Biofilm thickness was equal to 248±29 μm on day 250.

Free Ammonia Inhibition of NOB Activity

The concentration of free ammonia is directly affected by pH of the solution and increases at higher pH (Tenno et al., 2018). Free ammonia concentration had significantly increased after the pH set point was changed to 8.6 with average concentration of 1.1±0.2 mg NH3-N L-1. This concentration of FA did not negatively affect ammonia oxidation which is in agreement with Anthonisen (1977) who reported AOB inhibition at 7 mg NH3-N L-1. NOB activity was, however, successfully supressed at these conditions. These results agree with the observations that nitrite oxidizers are more susceptible to FA toxicity than AOB with inhibition reported at concentrations as low as 0.1 to 1.0 mg NH3-N L-1 (Turk and Mavinic, 1986). Other studies reported, however, NOB sensitivity comparable with AOB at 6.6 to 8.9 mg NH3-N L-1 (Mauret et al., 1996). Wong-Chong and Loehr (1975) reported, for a system of high ammonia of 100 to 1000 mg N/L, that acclimated culture of NOB could tolerate FA concentrations as high as 40 mg NH3-N L-1. In this study, however, NOB did not acclimate even to relatively low FA concentrations and during the 40 d of steady state operation effective inhibition was maintained.

In regard to Piculell et al. (2016), the authors believe that better nitritation was observed in thinner biofilms because of FA diffusion through the biofilm. The depth of FA penetration into the biofilm is directly proportional to the concentration in bulk and in thin biofilms FA can penetrate the whole depth of the biofilm hence successfully inhibiting NOB metabolism. In thicker biofilms, NOB communities in inner layers would be protected from exposition to FA.

Figure 4:
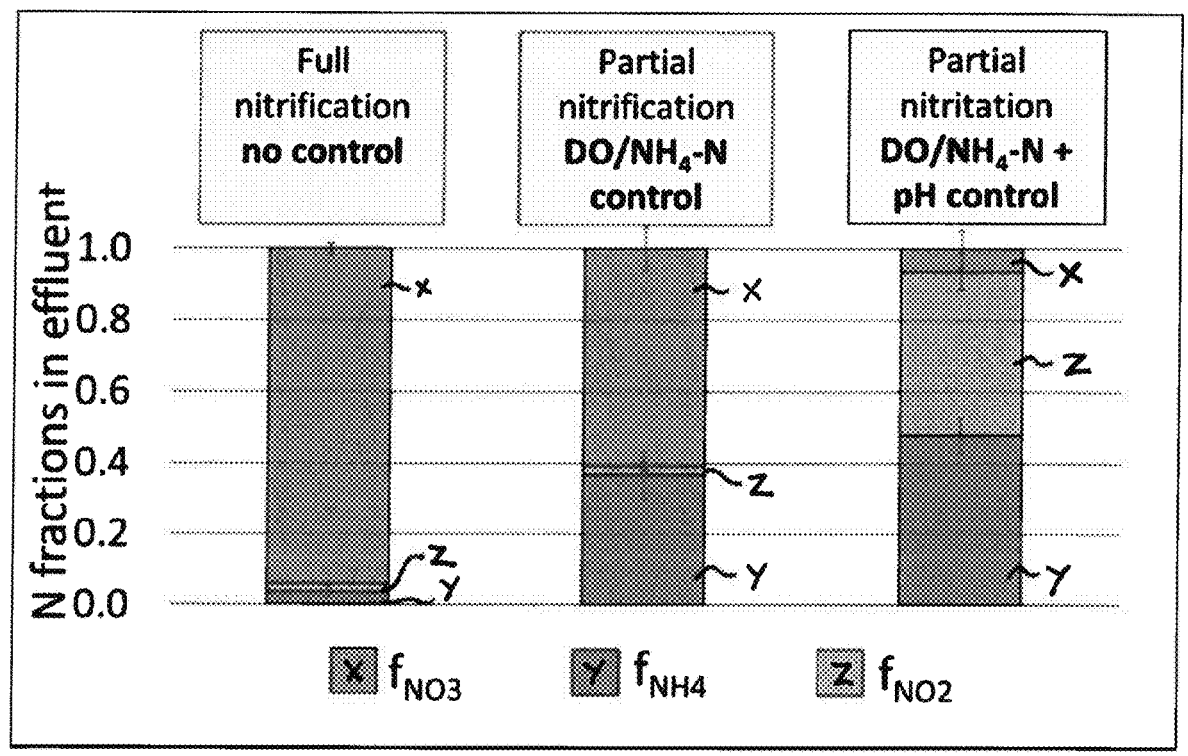
FIG. 4 illustrates inorganic nitrogen fractions in the effluent from the MBBR during different control strategies at 10° C.

FIG. 4 shows an overview of inorganic nitrogen fractionation obtained in the reactor with no process control, oxygen limitation (DO/NH4-N ratio control) and a combination of oxygen limitation and pH control (all at 10° C). Employing DO/NH4-N ratio control resulted in successful limitation of ammonium oxidation to approximately 60% (partial nitrification), however ammonium was still oxidized to nitrate, and no nitrite production was observed. Mainstream partial nitritation was only achieved by combining DO/NH4-N ratio control and pH control at 8.6. Nitritation was obtained by the inhibition of NOB metabolism by elevated concertation of FA at high pH.

Integration to Mainstream and Process Control

Figure 5:
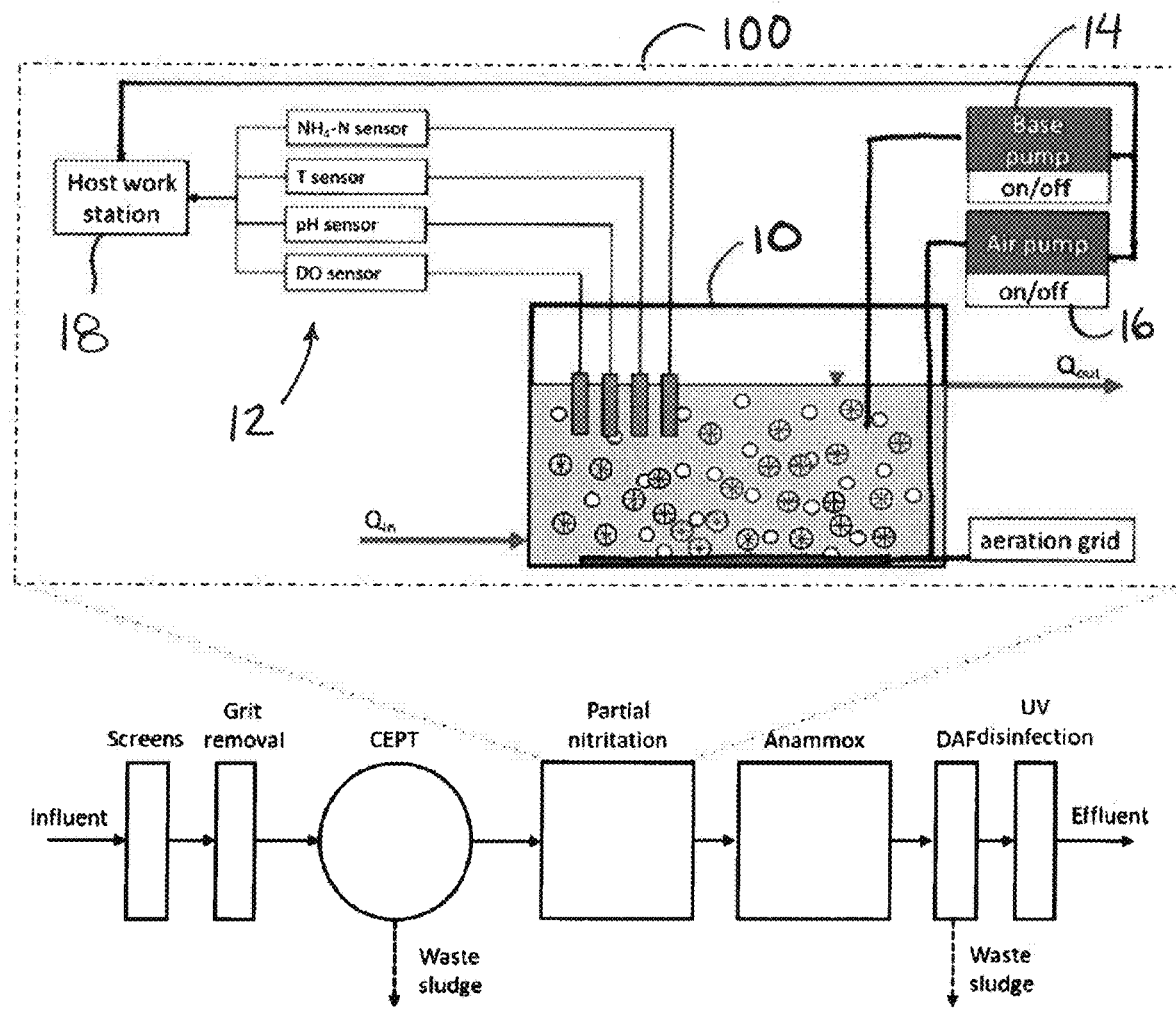
FIG. 5 is a schematic diagram of the proposed mainstream process configuration with two-stage partial nitritation-anammox integrated into the treatment train.

The results obtained from this study prove that two-stage MBBR approach for incorporating anammox process into mainstream is a viable option. FIG. 5 shows a schematic diagram of the proposed mainstream process configuration. Chemically enhanced primary treatment (CEPT) is proposed to remove phosphorus and capture a significant portion of organic carbon. Arguably, CEPT could be replaced with conventional primary clarification and subsequent enhanced biological phosphorus removal (EBPR) in anaerobic-toxic process (A/O). CEPT or EBPR is followed by a two-stage partial nitritation-anammox process and the treatment is finished with solids separation (DAF) and disinfection (UV).

The proposed configuration could arguably be more efficient than one-stage approach where partial nitritation and anammox occur in one reactor. The main reason for this is that with the presented control strategy it is relatively easy to control partial nitritation and solve the biggest problem in one-stage systems which is nitrate overproduction due to proliferation of NOB. This is especially true for temperatures below 15° C. and very low nitrogen concentrations. While one-stage systems are advantageous in side-stream applications (Lackner et al., 2014), the authors believe that separation of partial nitritation and anammox is a better solution for mainstream processes.

Figure 6:
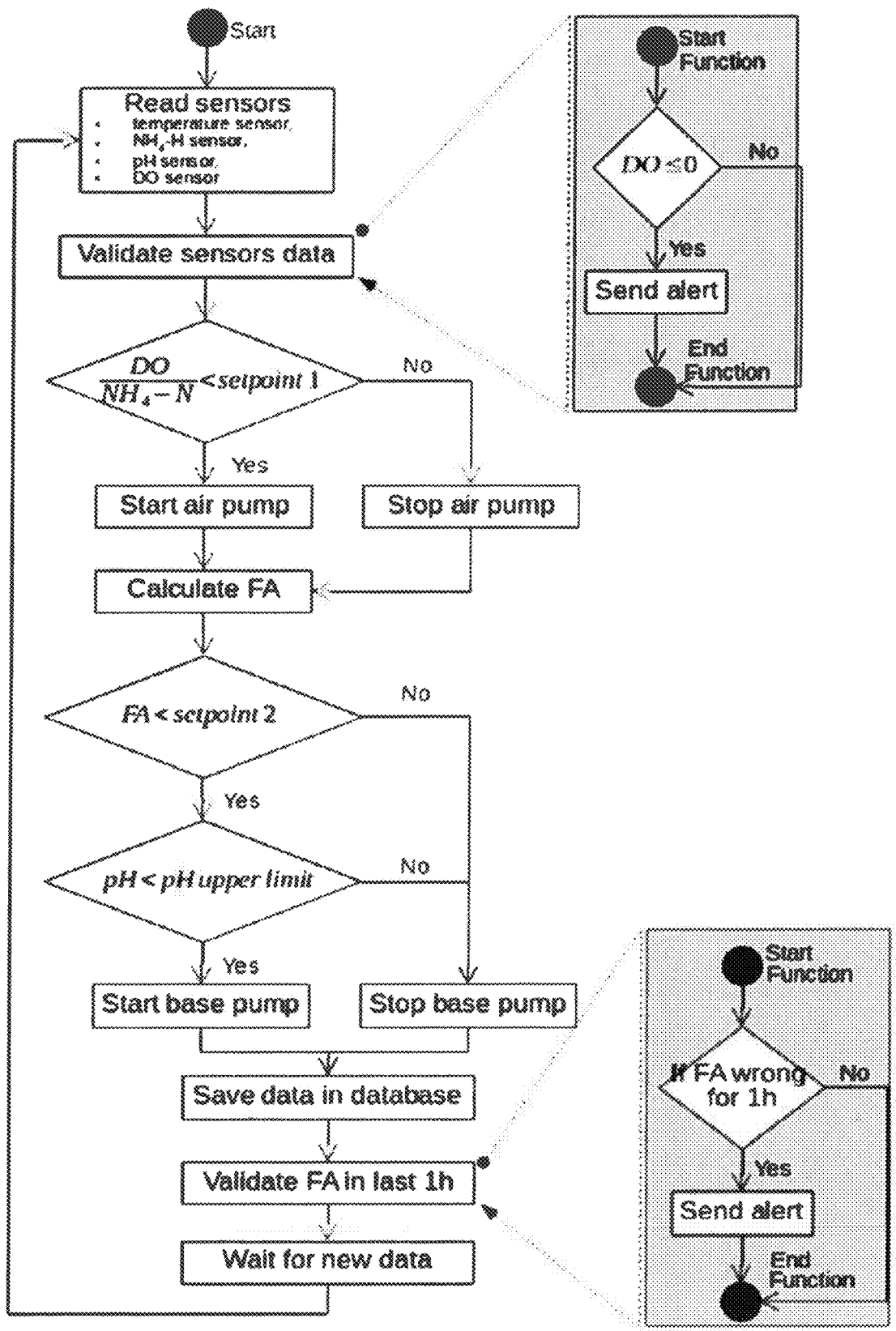
FIG. 6 is a flow chart representing the process control algorithm for partial-nitritation.

Dynamic process control algorithm for mainstream partial nitritation is presented in FIG. 6. The process is controlled by simultaneously maintaining two user-specified control setpoints. Firstly DO/NH4-N ratio is controlled at a certain setpoint (setpoint 1 in FIG. 6) to obtain TAN oxidation at 50% by monitoring NH4-N concentration in the reactor and controlling DO concentration. And secondly, FA concentration is controlled at a certain setpoint (setpoint 2 in FIG. 6) to obtain nitritation by inhibiting NOB activity. FA concentration is governed by temperature, pH and TAN concentration in bulk but only pH can be externally controlled. Hence, a base dosing system is used to increase the pH to obtain the specified FA concentration.

The exact values for both setpoints are dictated by the wastewater characteristics and temperature. Primarily by the concentration of biodegradable COD since both setpoints must be increased the higher the organic loading rate (OLR) gets. The biofilm will grow thicker at higher OLRs hence the FA setpoint has to be increased in order to enhance the FA penetration depth into the biofilm and successfully inhibit NOB. The setpoint for DO/NH4-N ratio also must be increased at higher OLRs as more oxygen is needed to oxidize the additional organic carbon. For the conditions and synthetic wastewater studied in this paper the setpoints were defined through the course of the experiment to be 0.06 for DO/NH4-N ration and 1.1 mg NH3-N L-1 for FA.

Cost of Nitrogen Removal from Wastewater

The chemical requirement needed to artificially increase pH is an additional operating cost associated with the proposed control strategy. Sodium hydroxide was chosen as the source of basicity due to it's ease of handling, ability to make 50% solutions and it has been a proven chemical of choice used in full-scale applications for sidestream phosphorus recovery. The average consumption of NaOH was estimated at 0.2 kg/m3 of wastewater. The cost of industrial grade NaOH varies greatly depending on the purity, however, assuming the average price of 200 $/tonne gives approximately 0.04 $/m3 of additional chemical cost. It is not easy to precisely estimate the operational costs of BNR plants as they vary greatly depending on process design, scale, energy costs, location etc. According to (Gratziou and Chrisochoidou, 2011) the total annual operating cost of an activated sludge process with pre-denitrification zone was 1.541 $/m3. Molinos-Senante et al. (2010) reported much lower operating costs estimated at 0.2651 $/m3. Similarly, Zessner et al. (2010) who showed that the cost of operating BNR plants in Austria ranges from 0.154 to 0.2251 $/m3. Rodriguez-Garcia et al. (2011) reported moderately higher range of 0.271-0.3201 $/m3. 373. The prices noted above are in USD and the inflation from the year of original publication was taken into account.

Integration of anammox into mainstream process is associated with potentially significant savings in operating costs. Energy requirement for aeration could be reduced by 50% compared to conventional nitrification-denitrification. External carbon requirement could be completely removed, and sludge production would be reduced at least by 50%. Assuming that energy and sludge disposal (including chemical costs and maintenance) make up around 60% of total operational costs of the treatment plant (Molinos-Senante et al., 2010), the authors believe that the additional chemical costs could be easily offset by the gained savings.

Conclusions

Partial nitritation at 10° C., low nitrogen concentration and high COD/N ratio (>2) has been shown to be feasible. Mainstream partial nitritation was achieved by combining two control strategies. The target level of ammonium oxidation was achieved by controlling DO/TAN ratio and nitritation was obtained by FA inhibition at high pH. Long term stability was successfully obtained at DO/TAN ratio of 0.06 and at FA concentration of 1.1±0.2 mg NH3-N L-1. NOB did not acclimate to FA during 40 days of steady state operation and were effectively inhibited. An algorithm for dynamic process control of partial nitritation has been also developed.

As described herein, partial nitritation is achieved by combining two control strategies. The target level of ammonium oxidation (50-55%) is achieved by controlling a ratio of dissolved oxygen concentration to a total ammonium concentration (DO/NH$_4$-N ratio) and nitritation is obtained by controlling pH at a high set-point by dosing highly alkaline solution (e.g. but not limited to NaOH) which increases the concentration of free ammonia (FA) in the biological reactor and inhibits and suppresses NOB activity.

FIG. 4 shows an overview of inorganic nitrogen fractionation obtained in the reactor with no process control, and a combination DO/NH$_4$-N ratio and pH control (all at 10° C.). Employing DO/NH$_4$-N ratio control resulted in successful limitation of ammonium oxidation to approximately 60% (partial nitrification), and nitritation was obtained by the inhibition of NOB metabolism by elevated concertation of FA at high pH.

A dynamic process control algorithm for mainstream partial nitritation is presented in FIG. 6. The process is controlled by simultaneously maintaining two user-specified control setpoints. Firstly, DO/NH$_4$-N ratio is controlled at a certain setpoint (setpoint 1 in FIG. 6) to obtain ammonium oxidation at 50% by monitoring NH$_4$-N concentration in the reactor and controlling DO concentration. And secondly, FA concentration is controlled at a certain setpoint (setpoint 2 in FIG. 6) to obtain nitritation by inhibiting NOB activity. FA concentration is governed by temperature, pH and TAN concentration in bulk but only pH can be externally controlled. Hence, a base dosing system is used to increase the pH to obtain the specified FA concentration.

The exact values for both setpoints are dictated by the wastewater characteristics and temperature. Primarily by the concentration of biodegradable COD since both setpoints must be increased the higher the organic loading rate (OLR) gets. The biofilm will grow thicker at higher OLRs hence the FA setpoint has to be increased in order to enhance the FA penetration depth into the biofilm and successfully inhibit NOB. The setpoint for DO/NH$_4$-N ratio also must be increased at higher OLRs as more oxygen is needed to oxidize the additional organic carbon.

There are two main features of the invention that are believed to be novel. First, the principle of combining both DO/NH$_4$ ratio and FA inhibition by adjusting pH to control partial nitritation process in a biological reactor. And second, the process control algorithm that allows for stable partial nitritation at variable flows and loads. The algorithm allows for dynamic changes in control setpoints to achieve target levels of ammonium oxidations and nitritation.

The proposed method has several advantages over existing solutions. More stable and precise control of nitritation can be achieved. Moreover, this method can be used in any kind of biological reactor and is not limited to only certain configurations. This method is also compatible with any kind of biocarriers and not only a certain type. What's more the method allows for high concentration of dissolved oxygen in reactor as it does not depend on microaerophilic conditions to achieve nitritation. In turn nitritation rates are high which reduces the required volume of the reactor.

The most unique aspect of the invention is its versatility as it can be incorporated into most reactor configurations whether biofilm or suspended growth reactors or one or two stage systems. Moreover, the proposed control method is remarkably flexible thanks to the process algorithm allowing to adjust control set-points for variability in wastewater flows and loads as well as seasonal temperature changes.

The invention was developed for two-stage partial nitritation—anammox systems. Which means that the two process are separated between two reactors. Nevertheless, the invention could be also used in one-stage systems where both partial nitritation and anammox occur in the sane reactor.

The invention has been shown to be successful at controlling partial nitritation in a moving bed biofilm reactor, however, it is not limited to it. It is expected to be also a viable solution for conventional activated sludge reactors as well granular sludge reactors or integrated fixed film activated sludge reactors.

The proposed invention can be used in the treatment of municipal wastewater but is not limited to it. It can also be used to treat reject waters from dewatering of digested sludge as well as in industrial wastewater treatment.

It is expected that the invention will result in the development of online process monitoring and control system (apparatus with integrated process control algorithm).

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method of treating wastewater comprising:
providing a biological reactor for receiving wastewater therein;
using an aerator to intermittently aerate the wastewater in the reactor;
using a plurality of condition sensors to generate condition signals from which a plurality of wastewater characteristics can be derived including a pH level, a dissolved oxygen level, an ammonium level, and a temperature of the wastewater in the reactor;

providing a controller including a prescribed primary threshold and a prescribed second threshold stored on the controller, the prescribed primary threshold comprising a free ammonium level threshold, and the prescribed second threshold comprising a ratio of dissolved oxygen to a total ammonium concentration threshold;

using the controller to calculate a ratio of dissolved oxygen to a total ammonium concentration based upon the wastewater characteristics derived from the condition sensors;

using the controller to control the aerator so as to maintain the ratio of dissolved oxygen to a total ammonium concentration below the prescribed second threshold;

using the controller to calculate a level of free ammonia based upon the wastewater characteristics derived from the condition sensors; and using the controller to dispense a controlled dosage of an alkaline control solution into the reactor in response to the calculated level of free ammonia being below the prescribed primary threshold simultaneously with control of the aeration of the reactor based on the prescribed second threshold to effect partial nitritation of the wastewater in the reactor.

2. The method according to claim 1 wherein the reactor comprises a moving bed biofilm reactor.

3. The method according to claim 1 wherein the reactor comprises an integrated fixed film activated sludge reactor.

4. The method according to claim 1 including ceasing dispensing of the alkaline control solution into the reactor in response to the pH level exceeding a pH threshold.

5. The method according to claim 1 including the controller dynamically adjusting the prescribed primary threshold stored on the controller dependent upon the wastewater characteristics derived from the condition sensors.

6. The method according to claim 5 including adjusting the prescribed primary threshold dependent upon the wastewater characteristics derived from the condition sensors including the temperature of the wastewater.

7. The method according to claim 1 including the controller dynamically adjusting the prescribed second threshold dependent upon the wastewater characteristics derived from the condition sensors.

8. The method according to claim 1 further comprising:
using the controller to generate a notification if the level of free ammonia has not increased over a prescribed time interval.

9. The method according to claim 7 including adjusting the prescribed second threshold dependent upon the wastewater characteristics derived from the condition sensors including the temperature of the wastewater.

* * * * *